United States Patent

Herrett

[15] 3,683,829
[45] Aug. 15, 1972

[54] PLANTING MACHINE AND SIZE-ADJUSTABLE HOPPER THEREFOR

[72] Inventor: Wilfred H. Herrett, Filer, Idaho

[73] Assignee: Acme Manufacturing Company, Inc., Filer, Idaho

[22] Filed: Aug. 12, 1970

[21] Appl. No.: 63,084

[52] U.S. Cl. .................111/73, 220/20, 239/673
[51] Int. Cl. ................................................A01c 5/00
[58] Field of Search .......111/73, 83, 61; 220/8, 22.1, 220/4, 20; 239/668, 673; 222/176, 177, 178, 135

[56] References Cited

UNITED STATES PATENTS

| | | | |
|---|---|---|---|
| 1,093,321 | 4/1914 | Ellis | 111/73 |
| 2,799,424 | 7/1957 | Good | 220/8 |
| 1,000,955 | 8/1911 | Shepherd | 220/8 |
| 2,648,464 | 8/1953 | Weeks | 111/73 X |
| 2,299,702 | 10/1942 | Mosel | 220/20 |
| 1,940,008 | 12/1933 | Mosgrove | 239/673 X |

Primary Examiner—Robert E. Bagwill
Assistant Examiner—R. T. Rader
Attorney—Mallinckrodt & Cornaby

[57] ABSTRACT

A conveniently filled hopper for seed to be planted comprises hopper sections mounted in mutually spaced, side-by-side relationship on a vehicular frame provided with running gear. The spacing of the seed hoppers and of planting means carried thereby relative to one another can be adjusted in accordance with crop row spacing. Each set of mutually adjacent, sloping bottom walls of mutually adjacent hopper sections is freely straddled by a ridge plate that accommodates different spacings of such walls. Likewise, in preferred embodiments which have mutually adjacent hopper section end walls that rise above the bottom walls, end plates bridge such end walls to close the spaces therebetween regardless of the extent of spacing of the hopper sections. The hopper structure itself can be used for many different purposes and can be variously mounted depending upon the particular use.

6 Claims, 3 Drawing Figures

PATENTED AUG 15 1972      3,683,829
FIG. 1
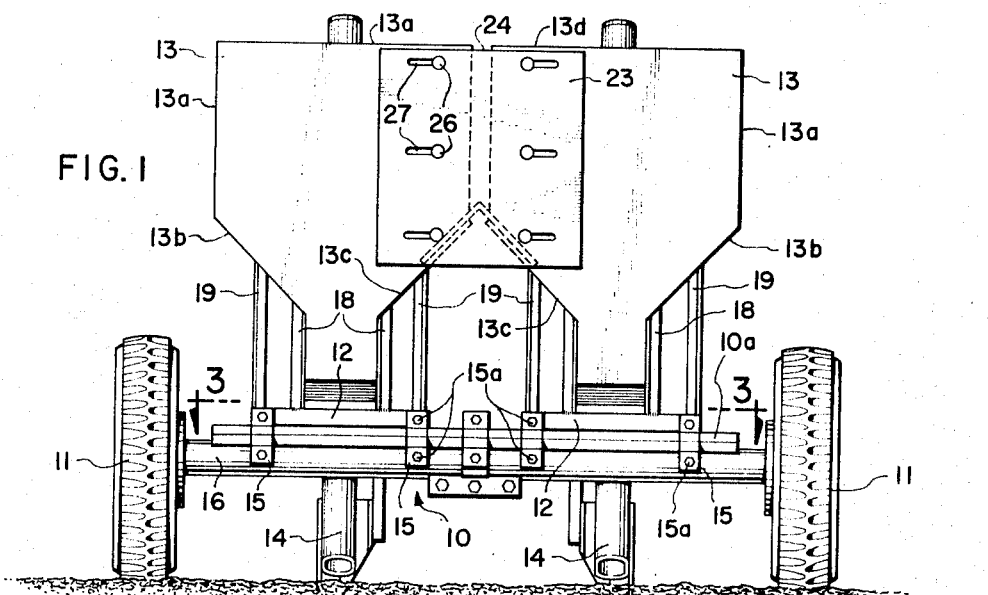
FIG. 3
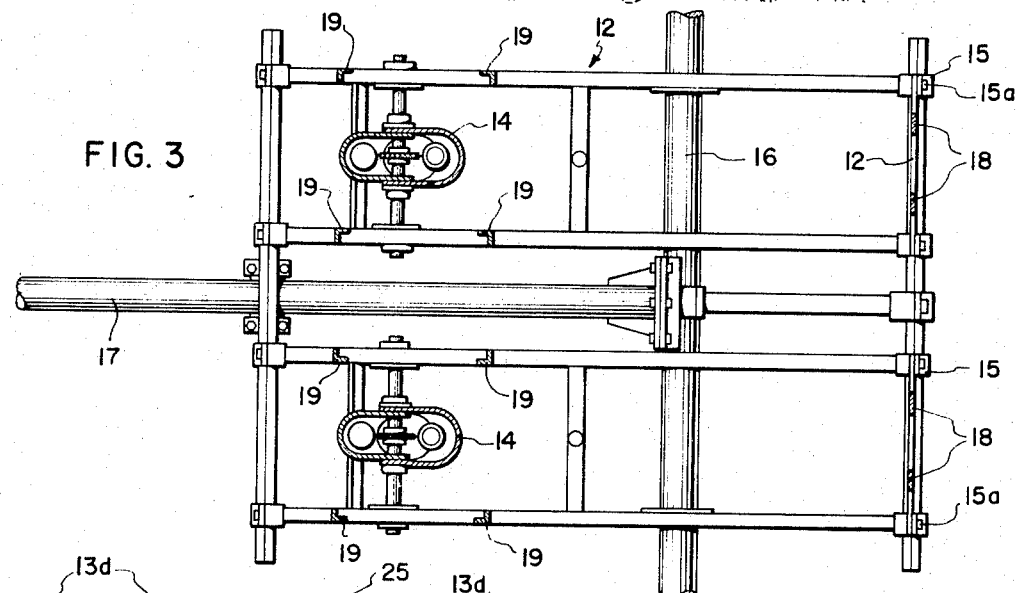
FIG. 2
INVENTOR.
WILFRED H. HERRETT
BY
ATTORNEYS 3,683,829

PLANTING MACHINE AND SIZE-ADJUSTABLE HOPPER THEREFOR

BACKGROUND OF THE INVENTION

Field

The invention relates in general to hopper or bin construction and in particular to seed planting machines utilizing seed hoppers supplying seed to planting means provided in multiple for planting a plurality of crop rows at a time.

State of the Art

Heretofore, it has been necessary to provide individual hoppers for individual planting shoes in planting machines utilizing a plurality of planting shoes arranged for adjustment in their spacing relative to one another to accommodate the different spacing of crop rows in the planting of different crops. This has necessitated individual loading of the individual hoppers, which is inconvenient and time consuming.

SUMMARY OF THE INVENTION

In accordance with the present invention, individual hopper sections are provided for individual planting shoes in a planting machine, but these are formed for integration into a single, large, size-adjustable hopper, so that the several hopper sections can be conveniently filled in common. Size adjustment to accommodate changes in crop row spacing is provided for by making the individual hopper sections with convergent bottom walls and by providing a ridge plate to freely cover the space between mutually adjacent bottom walls of mutually adjacent hopper sections, there being as many of such ridge plates as there are sets of mutually adjacent bottom walls. The hopper sections preferably have end walls rising above the bottom walls, and end plates are provided for bridging the spaces between mutually adjacent end walls of mutually adjacent hopper sections. In the planting machine, the individual hopper sections are mounted on mutually spaced sub-frames that are adjustably positioned on a vehicular frame, and such hopper sections have seed-planting shoes associated therewith so that a plurality of crop rows can be planted at the same time.

THE DRAWING

An embodiment of the invention in the form of planting machine for seed potatoes is illustrated in the accompanying drawing as the best mode presently contemplated of carrying out the invention.

In the drawing:

FIG. 1 represents a view in rear elevation of the planting machine;

FIG. 2, a similar view showing a wider spacing of the hoppers following adjustment from the condition of FIG. 1, portions of the hopper walls being broken out for convenience of illustration and to reveal the new positions of ridge plates and end plates; and FIG. 3, a horizontal section taken on the line 3—3 of FIG. 1 showing a presently preferred arrangement of supporting means for the individual hopper sections.

DETAILED DESCRIPTION OF ILLUSTRATED EMBODIMENT

The illustrated planting machine for seed potatoes is largely of known construction. Thus, it comprises a vehicular frame 10 provided with running gear indicated generally at 11. Mounted for sidewise adjustment on the frame 10 are sub-frames 12, FIG. 3 carrying respective hopper section 13. Planter shoes 14 of conventional type are secured to respective sub-frames and serve to receive seed potatoes from hopper sections 13 and to deposit them in respective crop rows. These shoes serve as planting means associated with the respective hopper sections for sidewise adjustment therewith when the sub-frames 12 are adjusted to vary the spacing between mutually adjacent hopper sections to conform to any given spacing of crop rows in a field to be planted. The hopper sections 13 are joined, as will appear hereinafter, to form a single large hopper that can be conveniently filled across its entire width simultaneously.

As illustrated, the sub-frames 12 are adjustably secured at front and back to cross-members 10a of the frame 10 by means of clamps 15 secured in position by bolts 15a. The vehicular frame 10 includes, in addition to the cross-members 10a (which may serve as tool bars), axle housing 16 and tongue 17. The latter is adapted for hitching to a conventional farm tractor used to tow the planting machine through the field during operation thereof. Cross-members 10a are rigidly secured to the tongue and the axle housing, respectively, as shown.

In this embodiment, hopper sections 13 are specially formed for sidewise adjustment relative to each other and for temporary joinder in any given adjusted position. Since there are only two hopper sections in the illustrated machine, each is formed with an outside wall 13a rising above convergent bottom walls 13b and 13c, and with front and rear end walls 13d, respectively, also rising above such bottom walls and to the same height as the outside wall 13a. Each of these hopper sections is secured to a corresponding sub-frame 12 by sets of legs 18 and 19.

For joining the hopper sections 13 regardless of the extent of their spacing relative to each other, a ridge plate 20 is set freely over the mutually adjacent but spaced bottom walls 13c of the mutually adjacent hopper sections, thereby closing the space therebetween, see the relatively narrow space 21, FIG. 1, and the relatively wide space 22, FIG. 2. Similarly, end plates 23, respectively, are provided to bridge the spaces, see 24, FIG. 1, and 25, FIG. 2, between mutually adjacent end walls 13d of the mutually adjacent hopper sections 13. Such end plates are preferably attached to the corresponding hopper end walls by bolts 26 passing through slots 27 in the end plates so as to provide for spacing adjustments of the hopper sections.

It should be realized that in instances of more than two hopper sections, the intermediate sections will not be provided with a side wall 13a. Also, while it is advantageous to construct the hopper as illustrated, the side and end walls need not rise higher than the sloping bottom walls in order to achieve the advantages of the tie-in between hopper sections that is provided by a ridge plate or plates. Again, the end plates may be formed integrally with opposite ends of the ridge plate if desired. Also, considerable variation in the construction of vehicular frame and sub-frames is possible. In fact, the legs 18 and 19 can rest on and be adjustably secured to the main frame, so as to in effect take over the roll of the sub-frames.

Whereas this invention is here illustrated and described with respect to a certain preferred form thereof, it is to be understood that many variations are possible without departing from the inventive concepts particularly pointed out in the claims.

I claim:

1. A planting machine, comprising a vehicular frame provided with running gear and adapted to support a seed-containing hopper and means for simultaneously planting a plurality of crop rows; a plurality of sub-frames mounted in side-by-side relationship on said vehicular frame for sidewise adjustment relative to each other; a hopper assembly for containing and dispensing seed, said hopper assembly including a plurality of mutually spaced, seed-dispensing hopper sections mounted on said sub-frames, respectively, for sidewise adjustment therewith relative to each other, said hopper sections having convergently sloping bottom walls, the upper ends of adjacent bottom walls of said hopper sections being spaced apart along mutually adjacent sides thereof; a ridge plate for each set of mutually adjacent bottom walls of mutually adjacent hopper sections, said ridge plate being received on and straddling said mutually adjacent bottom walls so as to close the respective spaces therebetween, whereby said hopper sections can be adjusted in spacing relative to one another and joined for filling in common as a single hopper; and a corresponding plurality of planting means associated with the respective hopper sections for sidewise adjustment therewith and with said sub-frames.

2. A planting machine in accordance with claim 1, wherein the hopper sections also have end walls rising above the bottom walls, and end plates are provided to bridge the spaces, respectively, between mutually adjacent end walls.

3. A planting machines in accordance with claim 2, wherein the respective end plates are adjustably attached to the corresponding sets of mutually adjacent end walls of the hopper sections.

4. A size-adjustable hopper structure, comprising a plurality of mutually spaced hopper sections mounted for sidewise adjustment relative to one another, said hopper sections having convergently sloping bottom walls, the upper ends of adjacent bottom walls of said hopper sections being spaced apart along mutually adjacent sides thereof; a ridge plate for each set of mutually adjacent bottom walls of mutually adjacent hopper sections, said ridge plate being freely received on and straddling said mutually adjacent bottom walls so as to close the respective spaces therebetween, whereby said hopper sections can be adjusted in spacing relative to one another and joined for filling in common as a single hopper; and means mounting said hopper sections for said sidewise adjustment relative to one another.

5. A size-adjustable hopper structure in accordance with claim 4, wherein the hopper sections also have end walls rising above the bottom walls, and end plates are provided to bridge the spaces, respectively, between mutually adjacent end walls.

6. A size-adjustable hopper structure in accordance with claim 5, wherein the respective end plates are adjustably attached to the corresponding sets of mutually adjacent end walls of the hopper sections.

* * * * *